(12) United States Patent
Uh et al.

(10) Patent No.: US 8,053,099 B2
(45) Date of Patent: Nov. 8, 2011

(54) SECONDARY BATTERY

(75) Inventors: Hwail Uh, Yongin-si (KR); Sangwoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 603 days.

(21) Appl. No.: 12/222,870

(22) Filed: Aug. 18, 2008

(65) Prior Publication Data

US 2009/0068550 A1 Mar. 12, 2009

(30) Foreign Application Priority Data

Sep. 10, 2007 (KR) .................. 10-2007-0091364

(51) Int. Cl.
*H01M 2/12* (2006.01)

(52) U.S. Cl. .......................... 429/56; 429/82

(58) Field of Classification Search .............. 429/58, 429/56, 185, 175, 72, 82; 137/68.27; 29/623.1
See application file for complete search history.

(56) References Cited

U.S. PATENT DOCUMENTS

| | | | |
|---|---|---|---|
| 4,207,385 A * | 6/1980 | Hayama | 429/56 |
| 2003/0131880 A1 | 7/2003 | Marubayashi et al. | |
| 2006/0263685 A1 * | 11/2006 | Kwon | 429/185 |
| 2006/0292437 A1 | 12/2006 | Matsumoto et al. | |

FOREIGN PATENT DOCUMENTS

| | | |
|---|---|---|
| CN | 1313642 A | 9/2001 |
| JP | 11-297292 A | 10/1999 |
| JP | 2002-008615 | 1/2002 |
| JP | 2004-178820 | 6/2004 |
| KR | 10-2006-0055400 A | 5/2006 |

OTHER PUBLICATIONS

Machine Translation of: JP 2004/178820 A, Hirakawa et al., Jun. 24, 2004.*
Machine Translation of: JP 11/297292 A, Azema et al., Oct. 29, 1999.*
Chinese Office Action issued by Chinese Patent Office on Nov. 17, 2010 corresponding to Korean Application No. 10-2007-0091364 with English translation attached.

* cited by examiner

*Primary Examiner* — Jonathan Crepeau
*Assistant Examiner* — Kenneth Douyette
(74) *Attorney, Agent, or Firm* — Robert E. Bushnell, Esq.

(57) ABSTRACT

A secondary battery is provided with a safety vent that can decrease the increased inner pressure of the secondary battery by being rapidly fractured when the inner pressure of the secondary battery is increased over a predetermined value. The secondary battery is constructed with a sealed outer case forming a receiving space in an inner side, an electrode assembly received in the receiving space of the outer case, a safety vent formed on one surface of the outer case, and a fracture induction part formed on the surface of the outer case and disposed at a portion of a circumference region of the safety vent. The fracture induction part is relatively thinner than the other portion of the surface of the outer case.

17 Claims, 5 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 10 Sep. 2007 and there duly assigned Serial No. 10-2007-0091364.

BACKGROUND OF THE INVENTION

1. Field of the Invention

The present invention relates to a secondary battery, and more particularly, a secondary battery including a safety vent that can prevent defective fracture, such as a leak, from being generated by an external impact, and that may be rapidly fractured so as to improve stability of the battery when an inner pressure of the battery is increased above a selected value.

2. Description of the Prior Art

With the use increase of portable electronic devices such as cellular phones, portable computers and portable personal digital assistants (PDAs), and the lightweight trend of electric bicycles, electric cars, and electric tools, the importance of a battery used for a power supply by the electronic products have become paramount, thereby driving much research on the design of batteries.

The secondary battery especially can be recharged and minimized, and have large capacity. Thus, a nickel-hydrogen (Ni-MH) battery and a lithium (Li) battery are widely used. Further, with the high performance and supply expansion of the portable electronic devices, the market for a small secondary battery has been expanded.

The lithium secondary battery has an operating voltage of 3.6 V that is three times more than the nickel-cadmium (Ni—Cd) battery or the nickel-hydrogen (Ni-MH) battery that are usually used as a power supply for portable electronic devices. In addition, the lithium secondary battery has a higher energy density per unit weight. Accordingly, the lithium secondary battery has been increasingly used in portable radio frequency devices as well as in other engineering fields.

The lithium secondary battery uses lithium group oxides as their cathode active material, and carbon material as their anode active material. Generally, the lithium secondary battery is divided into a liquid electrolyte battery and a polymer electrolyte battery, depending on a kind of an electrolyte. The lithium secondary battery has been fabricated in various types, such as a cylinder type, an angled type and a pouch type.

When the lithium secondary battery is overcharged, decomposition of the electrolyte occurs at the cathode, and that lithium metal is extracted at the anode. Thus, the battery may be degraded, and heat generation or firing in the battery may take place. The lithium secondary battery may generate gas inside the battery by an electrochemical reaction, and thus the pressure inside the battery may increase and the lithium secondary battery expands and becomes swollen. When the battery is under abnormal conditions, such as the occurrence of an internal short circuit or an overcharge of the battery, the lithium secondary battery may over-expand due to the increase of the inner pressure, and thus the battery may be fractured to fatally affect the stability of the battery.

Accordingly, the lithium secondary battery uses a safety vent to emit the gas generated inside of the battery to the atmosphere when the inner pressure of the secondary battery raises above a selected value. The safety vent may be made by a mechanical method, an etching method or an electric molding method. The safety vent is formed by making a groove with a certain depth in a portion of a cap plate or a can of the lithium secondary battery.

When a contemporary safety vent was formed in the cap plate or the can of the lithium secondary battery, however, the manufacturing process customarily used for forming the groove with a certain depth in each battery is difficult. Accordingly, operating pressure of the safety vent formed in the lithium secondary battery may not be uniform, so the credibility of the safety vent and the secondary battery including the safety vent has been declined.

Therefore, the safety vent may not be rapidly fractured even when the inner pressure of the battery raises above a certain value, or may be undesirably and defectively fractured in a leak type by an external impact generated when the battery is dropped.

SUMMARY OF THE INVENTION

It is therefore an object of the present invention to provide an improved safety vent and an improved secondary battery including the safety vent.

It is another object of the present invention to provide a secondary battery including a safety vent that can reduce an increasing inner pressure of the battery by being rapidly fractured when the inner pressure is increased over a certain value, and that can prevent a defective fracture such as a leak from being generated by an external impact.

Additional advantages, objects and features of the invention will be set forth in part in the description which follows and in part will become apparent to those having ordinary skill in the art upon examination of the following or may be learned from practice of the invention.

According to one aspect of the present invention, a secondary battery is provided with a sealed outer case forming a receiving space in an inner side, an electrode assembly received in the receiving space of the outer case, a safety vent formed on one surface of the outer case, and a fracture induction part formed on the surface of the outer case at a portion of a circumference region of the safety vent. The fracture induction part is relatively thinner than the other portion of the outer case.

The outer case may be constructed with a can having an opened side, and a cap plate sealing the opened side of the can. The safety vent and the fracture induction part may be formed on the cap plate.

The cap plate may have a horizontally elongated shape. The safety vent may be disposed on a portion of the cap plate that is close to a short side of the cap plate, and a distance between the fracture induction part and the short side of the cap plate may be larger than a distance between the safety vent and the short side of the cap plate.

The fracture induction part may be formed on a region of the cap plate which corresponds to one half of a horizontal length of the safety vent.

The fracture induction part may be formed to correspond to a side portion of the safety vent relative to a horizontally center line of the safety vent.

Different side portions of the cap plate relative to a horizontally center line of the cap plate may have different thickness, and the safety vent and the fracture induction part may be formed on one side portion of the cap plate which is relatively thicker than the other side portion of the cap plate.

Alternatively, the cap plate may be constructed with a vent formation part which is relatively thicker than the other portion of the cap plate, and the safety vent and the fracture induction part may be formed on the vent formation part of the cap plate.

The electrode assembly may be constructed with a cathode plate made from a conductive base material coated with a cathode active material, an anode plate made from a conductive base material coated with an anode active material, a separator interposed between the cathode plate and the anode plate, and a plurality of electrode taps. Each of the electrode taps has one side electrically coupled to either the cathode plate or the anode plate. The cap plate may be provided with an electrode terminal, and the cap plate and the electrode terminal are electrically insulated from each other. The plurality of the electrode taps of the electrode assembly may be electrically coupled to the electrode terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
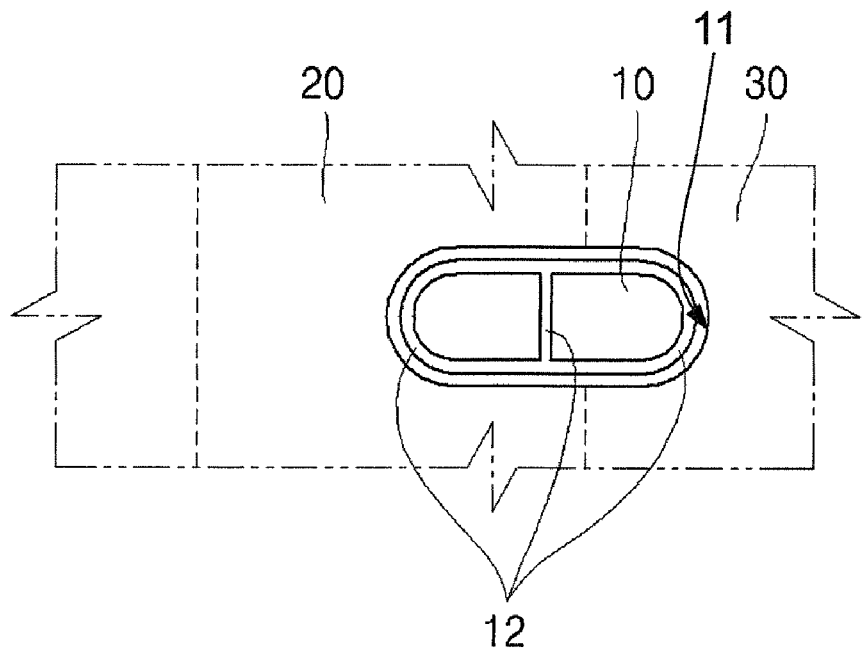
FIG. 1 is a schematic view illustrating a safety vent of a secondary battery according to one exemplary embodiment of the principles of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. The present invention is not limited, however, to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
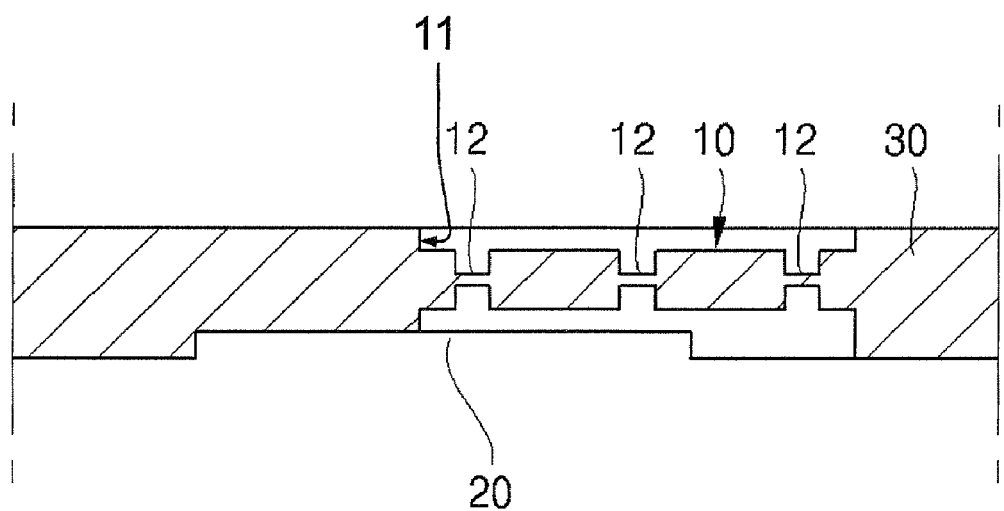
FIG. 2 is a cross-sectional view schematically illustrating a safety vent of a secondary battery according to another exemplary embodiment of the principles of the present invention.

FIG. 1 is a schematic view illustrating a safety vent of a secondary battery constructed as one exemplary embodiment according to the principles of the present invention, and FIG. 2 is a cross-sectional view schematically illustrating a safety vent of the secondary battery constructed as another exemplary embodiment according to the principles of the present invention.

Referring to FIG. 1, a safety vent 10 is constructed with a fracture induction part 20 having a relatively thin thickness. Fracture induction part 20 is formed on one surface of an outer case 30 of a secondary battery (not shown) that is constructed with safety vent 10. Referring to FIG. 2, safety vent 10 is formed to have grooves 12 on one surface of the secondary battery by press machining, and fracture induction part 20 is formed on a portion of a circumference region of safety vent 10. In the present exemplary embodiment, fracture induction part 20 may be formed on any one side of safety vent 10 relative to the approximate center of safety vent 10, but the present invention is not limited thereto.

The safety vent 10 is surrounded by a recess 11. When inner pressure of the secondary battery increases over a selected value, and safety vent 10 is pressurized, a part of safety vent 10 is rapidly fractured by fracture induction part 20 having the thin thickness, and then safety vent 10 is totally fractured. In other words, safety vent 10 may be rapidly fractured when the inner pressure of the secondary battery increases abnormally. A portion of the circumference region of safety vent 10 may be formed without fracture induction part 20, so as to be thicker than the portion of the circumference region that is formed with fracture induction part 20. Accordingly, although an external force may be applied to safety vent 10 when, for example, the secondary battery is dropped, safety vent 10 rarely generates defective fracture such as a leak.

Effect of the safety vent according to the present invention will be additionally explained in other exemplary embodiment described hereinafter.

Figure 3:
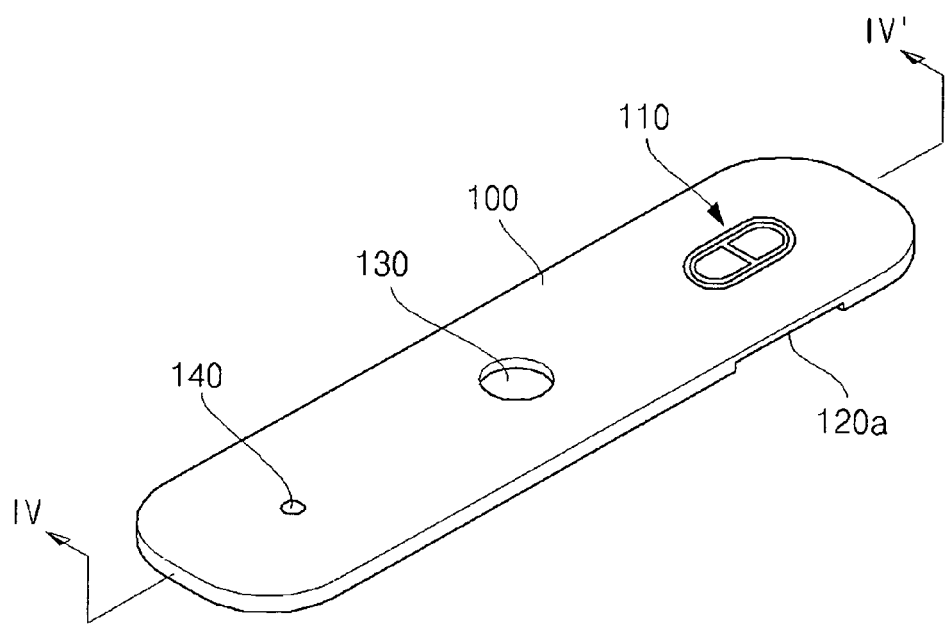
FIG. 3 is an oblique view illustrating a cap plate of the secondary battery constructed as one exemplary embodiment according to the principles of the present invention.
Figure 4:
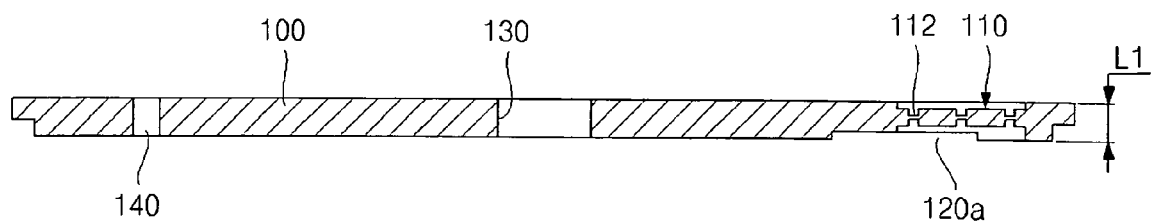
FIG. 4 is a cross-sectional view taken along line IV-IV' of FIG. 3.
Figure 5:
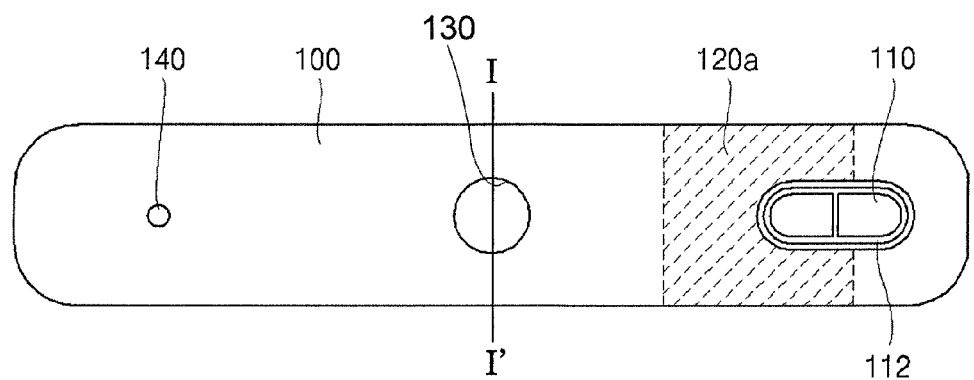
FIG. 5 is a plane view illustrating the cap plate of the secondary battery according to one exemplary embodiment of FIG. 3.

FIGS. 3 to 5 illustrate a cap plate constructed with the safety vent according to the present exemplary embodiment of the principles of the present invention. FIG. 3 is an oblique view illustrating a cap plate of the secondary battery constructed as one exemplary embodiment according to the principles of the present invention, and FIG. 4 is a cross-sectional view taken along line IV-IV' of FIG. 3, and FIG. 5 is a plane view illustrating the cap plate of the secondary battery according to the exemplary embodiment of FIG. 3.

Cap plate 100 has a horizontally elongated shape in the drawing. Safety vent 110 is formed on the left side of cap plate. An electrolyte injection hole 140 is formed on the right side of cap plate 10. Safety vent 110 is constructed with grooves 112 on cap plate 100 by press machining, and fracture induction part 120a is formed on a portion of a circumference region of safety vent 110. Fracture induction part 120a is formed to have a thickness that is relatively thinner than the other portion of cap plate 100.

It is desirable that fracture induction part 120a is formed with a selected size and is formed on any one side region relative to the approximate center of safety vent 110. For example, fracture induction part 120a is formed on a region corresponding to one half of a horizontal length of safety vent 110.

If fracture induction part 120a is formed on a too small region comparing to a total size of safety vent 110, fracture induction part 120a may not rapidly fracture as the inner pressure of the secondary battery increases. On the contrary, if fracture induction part 120a is formed on a too large region comparing to the total size of safety vent 110, fracture induction part 120*a* may easily induce defective fracture such as a leak by an external force resulted from, for example, dropping of the seal battery.

When safety vent 110 is formed on the horizontally elongated cap plate 100 in the drawing, it is desirable that fracture induction part 120*a* is formed on a left-side portion of the circumference region of safety vent 110 relative to an approximate center of safety vent 110. In other words, because the distance between the left-side edge of safety vent 110 and the right-side short edge of cap plate 100 is relatively larger than the distance between the right-side edge of safety vent 110 and the right-side short edge of cap plate 100, fracture induction part 120*a* is formed on the left-side portion of the circumference region of safety vent 110. That is because a portion of cap plate 100 that is adjacent to either the left-side short edge or the right-side short edge of cap plate 100, receives higher impact when the secondary battery is dropped.

When the inner pressure of the secondary battery increases above a certain value, and the inner pressure is applied to cap plate 100 and safety vent 110 formed on the secondary battery, a part of safety vent 110 is rapidly fractured by fracture induction part 120*a* having a thickness that is relatively thinner than the other portion of cap plate 100, and then safety vent 110 is totally fractured. In other words, safety vent 110 may be rapidly fractured when the inner pressure of the secondary battery is increased abnormally. A portion of the circumference region of safety vent 110 may be formed without fracture induction part 120*a*, so as to be thicker because of the absence of fracture induction part 120*a*. Accordingly, although an external force may apply to safety vent 110 when the secondary battery is, for example, dropped, safety vent 110 is reinforced by the thick portion of cap plate 100 that is located on a portion of the circumference region of safety vent 110, and then a defective fracture, such as a leak, may rarely occur.

Figure 6:
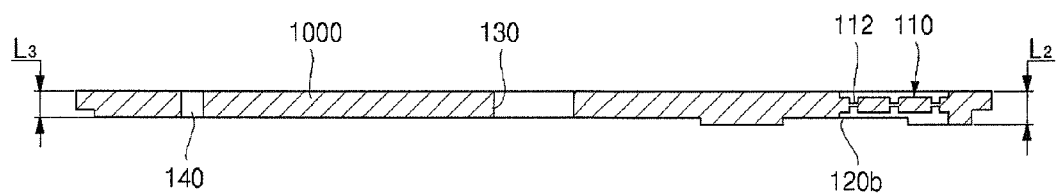
FIG. 6 is a cross-sectional view illustrating a cap plate of a secondary battery constructed as another exemplary embodiment according to the principles of the present invention.

FIG. 6 illustrates a cap plate constructed with a safety vent and having a shape different from the cap plate shown in the exemplary embodiment of FIGS. 3 to 5. Either one of a right-side portion and a left-side portion of cap plate 1000 is constructed to be relatively thicker than the approximate middle portion of cap plate 1000. Safety vent 110 and fracture induction part 120*b* are formed on the portion of cap plate 1000 that is formed to be relatively thick.

That is, either a left-side portion or a right-side portion of cap plate 1000 that is provided with safety vent 110 is formed to be thicker than the other portion of cap plate 1000. In one embodiment of the present invention as shown in FIG. 6, safety vent 110 and fracture induction part 120*b* are formed on the right-side portion of cap plate 1000. Therefore, the right-side portion of cap plate 1000 is formed to be thicker than the left-side portion of cap plate 1000.

Safety vent 110 may be rapidly fractured by fracture induction part 120*b* according to the structure of cap plate 1000. Since safety vent 110 and fracture induction part 120*b* are formed on a thick portion of cap plate 100, safety vent 110 does not generate a defective fracture, such as a leak, by the external force, although the total thickness of cap plate 1000 does not increase.

Referring to FIG. 6, L2 indicates a thickness of a portion of cap plate 1000 constructed with safety vent 110, and L3 indicates a thickness of another portion of cap plate 1000 where safety vent 110 is not formed. FIG. 5 shows that, the portion having thickness L2 and the portion having thickness L3 are symmetrically disposed based on the horizontally central line I-I' in the plan view of the cap plate 100. Increasing of the amount of material and the cost for manufacturing cap plate 1000 constructed with a larger thickness may be minimized by making L3 to have the same as the thickness of a contemporary cap plate, and making L2 (the same thickness as L1 in FIG. 4) to be larger than the thickness of the contemporary cap plate.

Alternatively, the cap plate may be constructed with a vent forming part (not shown) on a portion of the cap plate, and the vent forming part is relatively thicker than the other portion of the cap plate. And the safety vent and the fracture induction part may be formed on the vent forming part.

Figure 7:
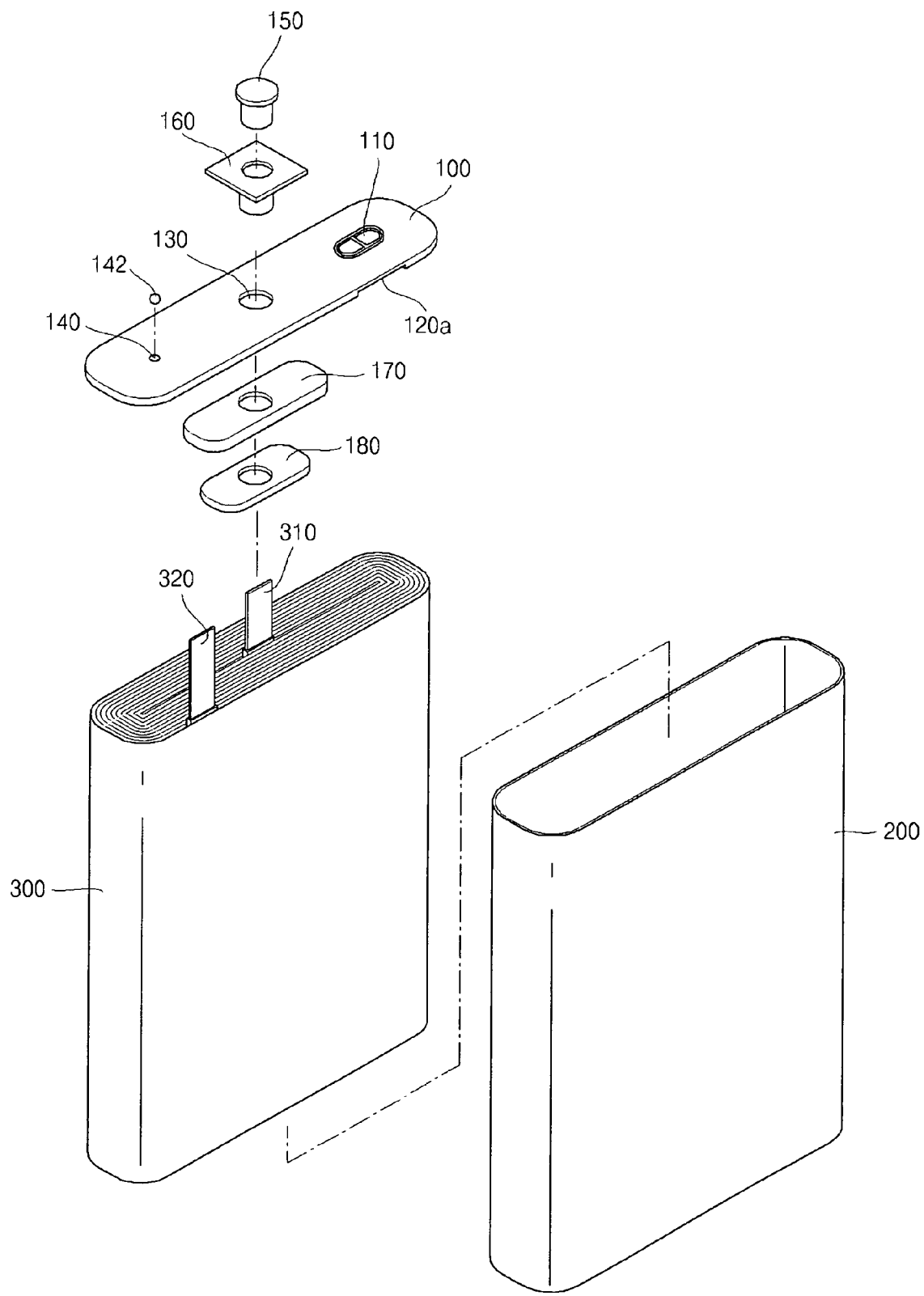
FIG. 7 is an exploded oblique view illustrating a secondary battery constructed with the cap plate illustrated in FIG. 3.
Figure 8:
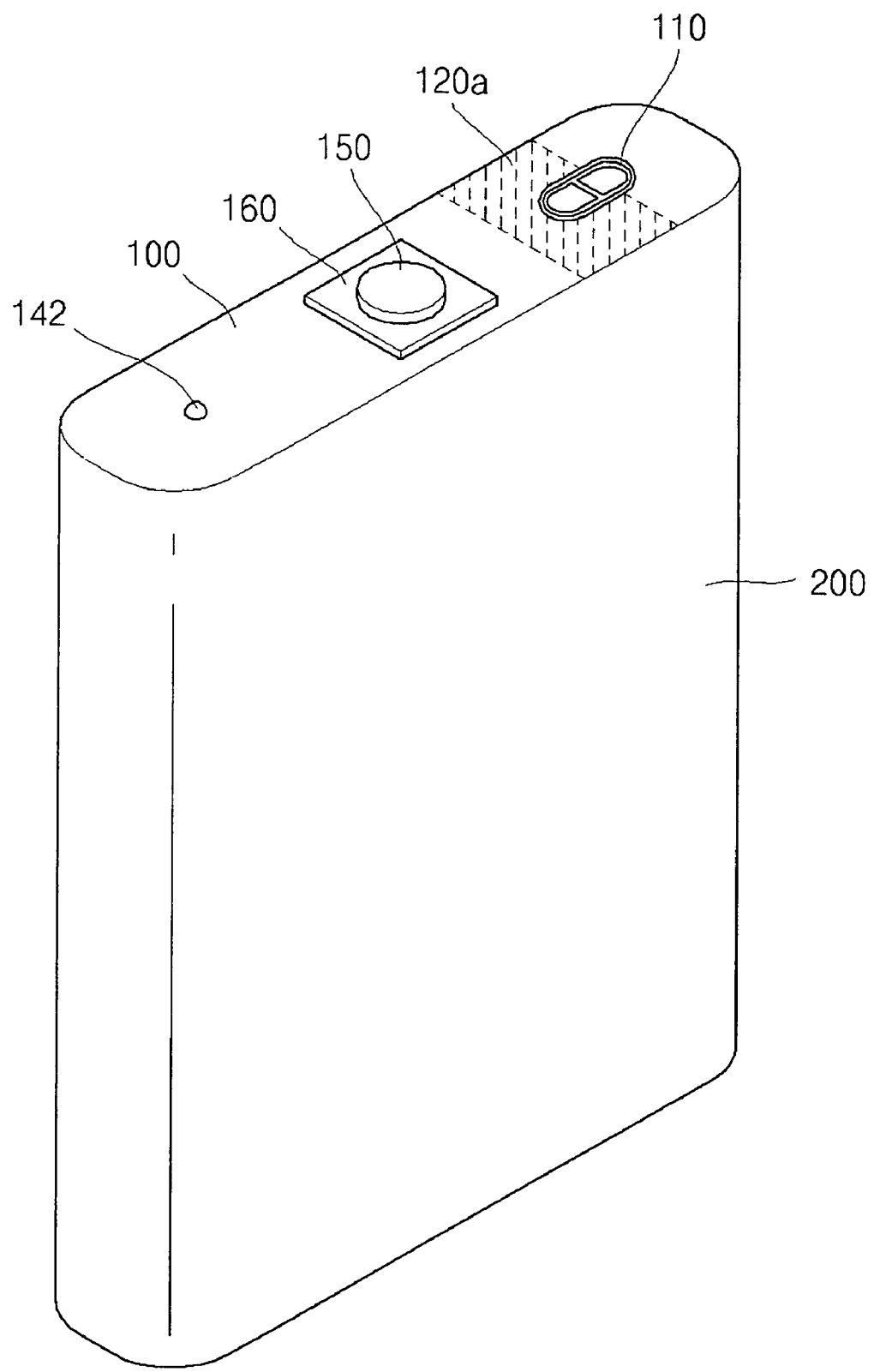
FIG. 8 is an oblique view illustrating a coupled state of the secondary battery illustrated in FIG. 7.

FIGS. 7 and 8 illustrate a secondary battery constructed with the cap plate according to the exemplary embodiments of FIGS. 3 to 5. A secondary battery is constructed with a can 200 forming an outer case for the secondary battery, a cap plate 100, an electrode assembly 300, a safety vent 110, and a fracture induction part 120*a*.

Can 200 is formed in a rectangular parallelepiped shape or a shape similar to the rectangular parallelepiped, and can 200 is constructed with one opened side so as to receive electrode assembly 300 through the opened side. Can 200 may be made from any metal selected from a group of aluminum (Al), nickel (Ni)-plated aluminum, steel (Fe), stainless steel (SUS), copper (Cu), copper alloy or their equivalents, but the present invention is not limited thereto.

Cap plate 100 is coupled to an upper part of can 200 for preventing electrode assembly 300 from moving out of cap 200. In other words, cap plate 100 is welded to the opened side of can 200. An electrode terminal 150 interposed by an insulation gasket 160 is coupled to a center of cap plate 100 so as to prevent an electrical short-circuit. An electrolyte injection hole 140 is formed on a portion on one side of cap plate 100, and safety vent 110 and fracture induction part 120*a* are formed on a portion the other side of cap plate 100. Since safety vent 110 and fracture induction part 120*a* are described in detail in the exemplary embodiments of FIGS. 3 to 5, a detailed explanation of safety vent 110 and fracture induction part 120*a* will be omitted. A plug 142 for preventing an electrolyte from leaking is coupled to electrolyte injection hole 140.

Cap plate 100 may be made from any one selected from aluminum (Al), nickel (Ni)-plated aluminum, steel (Fe), stainless steel (SUS), copper (Cu), copper alloy or their equivalents, but the present invention is not limited thereto. Insulation gasket 160 and electrode terminal 150 are coupled to an upper part of cap plate 100, and a through-hole 130 coupled to insulation gasket 160 and electrode terminal 150 is formed on an approximate center of cap plate 100. A terminal plate 180 and an insulation plate 170 are located on a lower part of cap plate 100.

A cathode plate, a separator and an anode plate are laminated and are wound several times, and then electrode assembly 300 is resulted. A plurality of electrode taps 310 and 320 are electrically coupled to electrode assembly 300, with each electrode tap being electrically coupled to either one of the cathode plate and the anode plate. In the present exemplary embodiment as shown in FIG. 7, a pair of electrode taps is coupled to the cathode plate and the anode plate, but the present invention is not limited thereto.

The cathode plate may be made from contemporary aluminum foil (not shown), and cathode active material (for example, cobalt lithium oxide, nickel lithium oxide, manganese lithium oxide or their equivalents) may be coated onto a surface of the cathode plate. The separator may be made from a porous material such as polyethylene (PE) and polypropylene (PP) that lithium ions can pass through. The anode plate may be made from copper foil (not shown), and anode active material (for example, graphite, carbon or their equivalents) may be coated onto a surface of the anode plate.

An insulation tape (not shown) is adhered to a surface of electrode assembly 300, and thus an unfastening of electrode assembly 300 is prohibited. Electrode assembly 300 may be easily inserted into can 110.

The secondary battery including the safety vent according the present invention produces the following effects.

First, the safety vent can decrease the increasing inner pressure of the secondary battery by being rapidly fractured when the inner pressure of the secondary battery is increased over a predetermined value.

Second, the secondary battery including the safety vent can prevent a defective fracture of the safety vent, such as the leak, even when an external impact such as dropping of the battery applies to the battery, and can largely reduce the defective fracture and the abnormal operation of the safety vent.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
   an outer case;
   an electrode assembly received inside the outer case;
   a cap plate sealing the electrode assembly within the outer case;
   a safety vent formed within a first region on one major surface of the cap plate, the first region being relatively thinner than a majority of the cap plate, the safety vent comprising a peripheral groove formed within the first region that decreases the cap plate to a least thickness; and
   a fracture induction part formed on a second region of the cap plate, the fracture induction part partially overlapping the first region and being relatively thinner than the majority of the cap plate, and the cap plate having a lesser thickness where the first region and the fracture induction part overlap.

2. The secondary battery of claim 1, comprised of the fracture induction part being formed on a region of the outer case which corresponds to one half of a horizontal length of the safety vent.

3. The secondary battery of claim 1, comprised of the fracture induction part being formed to correspond to a side portion of the safety vent relative to a center line of the safety vent.

4. The secondary battery of claim 1, comprised of the outer case comprising:
   a can having an opened side; and
   the cap plate sealing the opened side of the can, with the safety vent and the fracture induction part being formed on the cap plate.

5. The secondary battery of claim 4, comprised of the cap plate having a horizontally elongated shape, with the safety vent disposed on a portion of the cap plate that is close to a short side of the cap plate, and a distance between the fracture induction part and the short side of the cap plate being larger than a distance between the safety vent and the short side of the cap plate.

6. The secondary battery of claim 5, comprised of the fracture induction part being formed on a region of the cap plate which corresponds to one half of a horizontal length of the safety vent.

7. The secondary battery of claim 5, comprised of the fracture induction part being formed to correspond to a side portion of the safety vent relative to a horizontally center line of the safety vent.

8. The secondary battery of claim 4, comprised of different side portions of the cap plate relative to a horizontally center line of the cap plate having different thickness, and the safety vent and the fracture induction part being formed on one side portion of the cap plate which is relatively thicker than the other side portion of the cap plate.

9. The secondary battery of claim 4, comprised of the cap plate comprising a vent formation part which is relatively thicker than the other portion of the cap plate, and the safety vent and the fracture induction part being formed on the vent formation part of the cap plate.

10. The secondary battery of claim 4, comprised of the electrode assembly comprising:
    a cathode plate made from a conductive base material coated with a cathode active material;
    an anode plate made from a conductive base material coated with an anode active material;
    a separator interposed between the cathode plate and the anode plate; and
    a plurality of electrode taps, with each of the electrode taps having one side electrically coupled to either one of the cathode plate and the anode plate, the cap plate comprising an electrode terminal, the cap plate and the electrode terminal being electrically insulated from each other, and the plurality of the electrode taps of the electrode assembly being electrically coupled to the electrode terminal.

11. The secondary battery of claim 1, comprised of the safety vent comprising a groove formed on one surface of the outer case, and the safety vent being fractured along the groove.

12. The secondary battery of claim 1, comprised of the electrode assembly comprising:
    a cathode plate made from a conductive base material coated with a cathode active material;
    an anode plate made from a conductive base material coated with an anode active material;
    a separator interposed between the cathode plate and the anode plate; and
    a plurality of electrode taps, with each of the electrode taps having one side electrically coupled to either one of the cathode plate and the anode plate, the cap plate comprising an electrode terminal, the cap plate and the electrode terminal being electrically insulated from each other, and the plurality of the electrode taps of the electrode assembly being electrically coupled to the electrode terminal.

13. A secondary battery, comprising:
    an outer case;
    an electrode assembly sealed inside the outer case;
    a safety vent formed within a first region on side of one major surface of the outer case, the first region being relatively thinner than a majority of the major surface, the safety vent comprising a peripheral groove, formed within the first region that decreases the major surface to a least thickness; and a fracture induction part formed on a second region of the outer case, the fracture induction part partially coextensively overlapping the first region and being relatively thinner than the majority of the major surface of the outer case, and the major surface of the outer case having a lesser thickness where the first region and the fracture induction part coextensively overlap.

14. The secondary battery of claim 13, comprising:
a diametrical groove connecting opposite sides of the peripheral groove formed within the first region that decreases the major surface to the least thickness.

15. The secondary battery of claim 13, comprising:
the peripheral groove comprised of a plurality of peripheral grooves formed on opposite sides of the outer case within the first region to decreases the major surface to the least thickness.

16. The secondary battery of claim 13, comprising:
the peripheral groove comprised of a plurality of peripheral grooves formed on opposite sides of the outer case within the first region to decreases the major surface to the least thickness; and
a plurality of diametrical grooves connecting opposite sides of corresponding ones of the plurality of peripheral grooves formed on the opposite sides.

17. The secondary battery of claim 13, comprising:
the peripheral groove comprised of a plurality of peripheral grooves formed on opposite sides of the outer case within the first region to decreases the major surface to the least thickness; and
the fracture induction part formed on one of the opposite sides of the outer case.

* * * * *